March 14, 1933.  R. W. CARLISLE ET AL  1,901,631
DIAPHRAGM
Filed Feb. 15, 1930   2 Sheets-Sheet 1
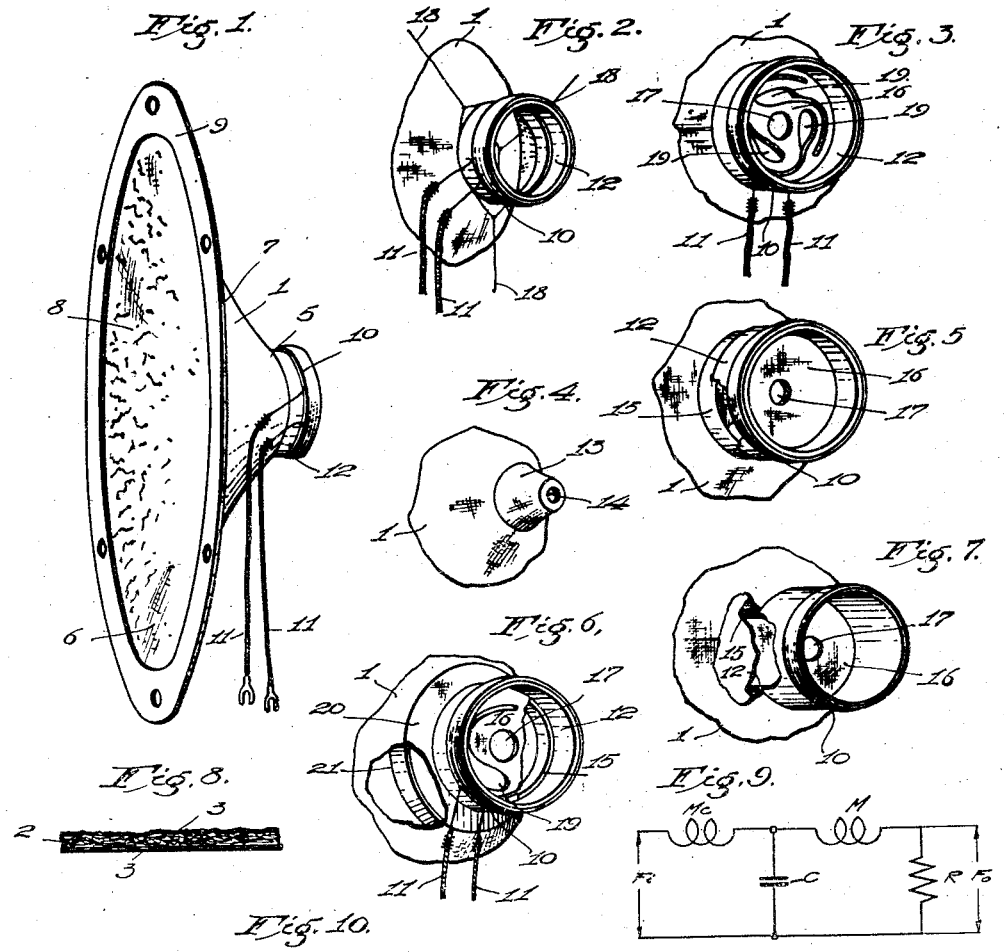
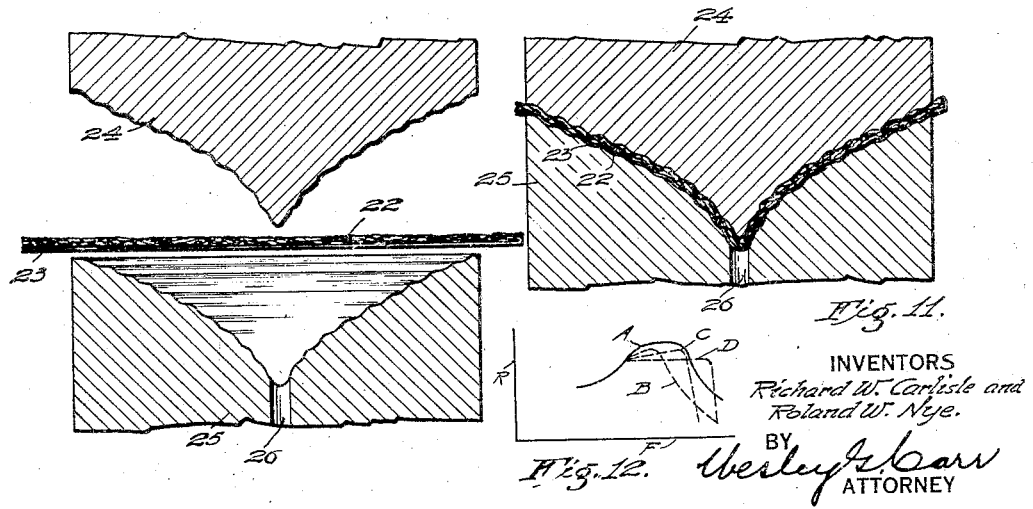
INVENTORS
Richard W. Carlisle and
Roland W. Nye.
BY
ATTORNEY March 14, 1933.   R. W. CARLISLE ET AL   1,901,631
DIAPHRAGM
Filed Feb. 15, 1930   2 Sheets-Sheet 2
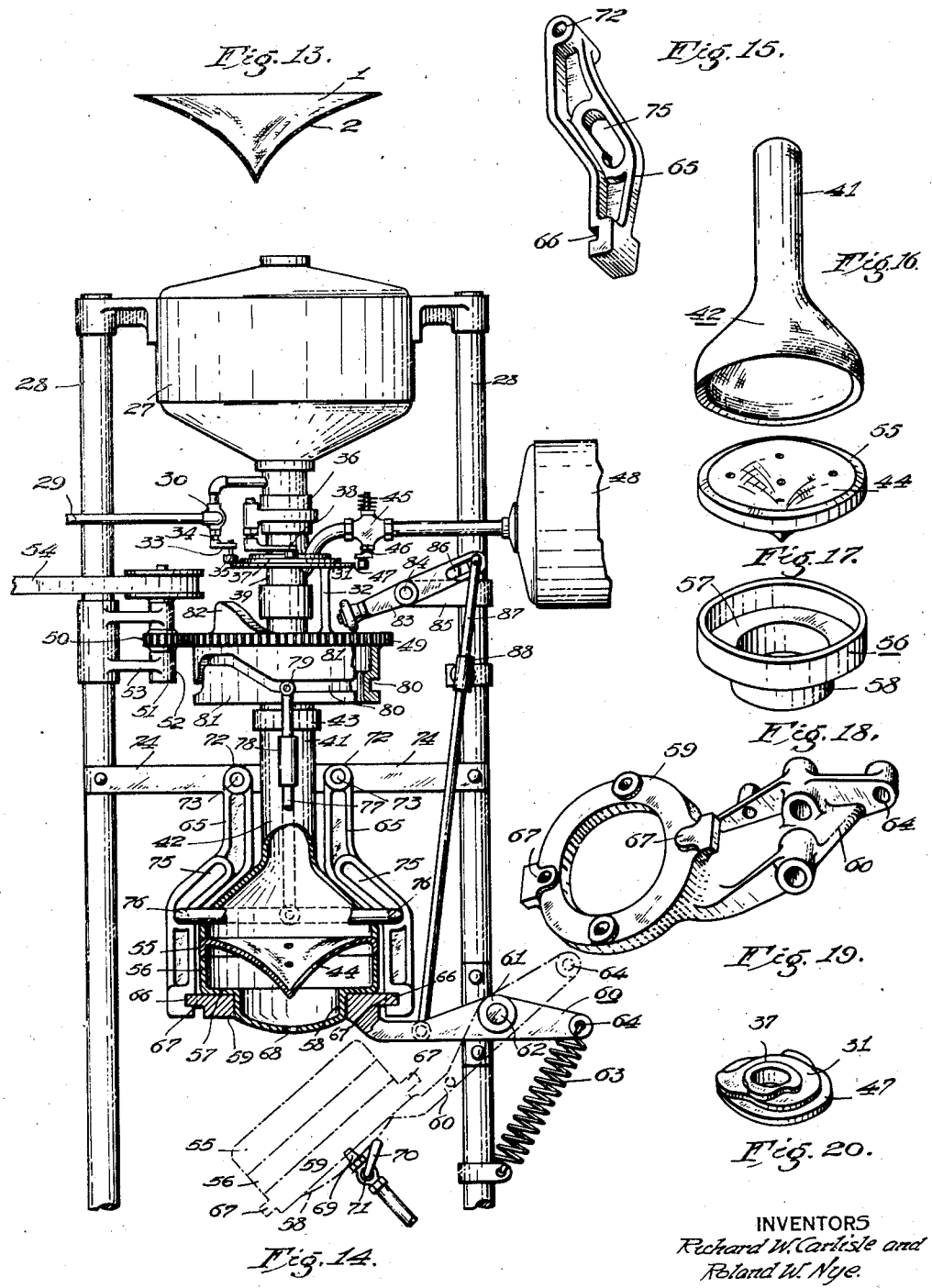
INVENTORS
Richard W. Carlisle and
Roland W. Nye.
BY
Wesley G. Carr
ATTORNEY Patented Mar. 14, 1933

1,901,631

UNITED STATES PATENT OFFICE

RICHARD W. CARLISLE, OF OAKLYN, NEW JERSEY, AND ROLAND W. NYE, OF WILKINSBURG, PENNSYLVANIA, ASSIGNORS TO WESTINGHOUSE ELECTRIC AND MANUFACTURING COMPANY, A CORPORATION OF PENNSYLVANIA

DIAPHRAGM

Application filed February 15, 1930. Serial No. 428,646.

Our invention relates to sound-reproducing equipment and it has particular relation to sound-amplifying diaphragms embodied therein.

As has long been known in the art, the principal phenomenon involving the production of sound comprises the juxtaposition of a vibrating body and an elastic medium. The vibrating body establishes temporal and spacial variations in the density of the medium, and the magnitude of the vibrations determines the loudness of the sound, the complexity of the vibrations determines its overtones, and the frequency of the vibrations determines its pitch.

Sound-reproducing devices similar to our invention and made according to the teachings of the prior art, with which we are familiar, comprise cones constructed of some fabric that is shaped, after it has been impregnated with some stiffening material. These cones, comprising the vibrating bodies to which reference was made above, are rigidly fastened to elements that ordinarily vibrate under an electromagnetic action to vibrate therewith, thus imparting variations in density to the elastic medium, usually air, with which they are in direct contact. That fabric cones do not yield the most satisfactory results, will be seen from the following consideration.

The mathematical treatment of the problem of vibrating bodies establishing relations between the physical and geometric nature of the bodies and the physical properties of the medium in which they vibrate, has only been developed for extremely simple vibrations, as in thin circular discs, and is, at present, far from complete and dependable even for these bodies.

For diaphragms of more complex structure, such as are at present utilized in the sound-reproducing art, the equipment of even the best-trained mathematicians has been entirely inadequate, and the analysis of problems relative to these bodies has yielded very little important information.

For these vibrators, simple physical considerations coupled with experimental information yield the most useful results. Accordingly, the reasoning process with reference to the diaphragm that comprises the subject of the present invention must be of this nature.

In the past, it has been customary, in treating, theoretically, vibrating membranes in the low-frequency range of the sound spectrum, to simplify the problem by substituting a rigid disc for the flexible membrane. The motion in which the sound originates may thus be regarded as a piston-like motion, that is, as a motion having no component parallel to the initial position of the diaphragm.

A similar consideration is applicable to the present instance as it is clear that, for sufficiently low frequencies, a conoidal diaphragm vibrates as a piston, while, for high frequencies, it vibrates as a membrane.

The range of frequencies over which the diaphragms may be regarded as vibrating as a rigid unit is determined by the stiffness of the diaphragm material and by its density. The latter pertains to the inertial resistance, set up in its material, to the vibration of the diaphragm as a unit, and the former pertains to the structural resistance, to its internal deformation, under external forces set up in the diaphragm material. Again, the mass of the cone determines its acceleration under the action of external forces and, hence, determines with what fidelity it will follow a given excitation. Finally, the surface of the diaphragm imparts its motion to the molecules of the surrounding medium, and its area, in a general way, determines the number of molecules moved by the vibrating body and, hence, determines the intensity of the sound.

The following general conclusions may be drawn from the above considerations.

1. The upper limit for the frequency at which the diaphragm vibrates as a unit increases, in a general way, as its stiffness increases and as its density decreases.

2. The acceleration imparted to the diaphragm by an exciting force is inversely proportional to its mass, hence, a light diaphragm is more sensitive than a heavy one.

3. The intensity of the sound excited by a body vibrating as a piston, in a general way, increases with the area of its vibrating surface.

It is reasonable to assume that the piston-like vibration is more efficient from an acoustic standpoint than the membrane-like vibration. The question of internal damping resulting from the viscosity of the material is not involved in piston-like vibration and, furthermore, in this mode of vibration, there is no difficulty with interference between the various disturbances moving along the diaphragm material. It has been found by experiment that, in the vibrating membrane these disturbances counteract each other to cause the sound to be radiated principally from the rim region of the cone.

Furthermore, if sufficiently light, the piston-vibrator has a rather uniform frequency-response characteristic, for the useful range of the sound spectrum, as its resonance frequency, depending on an external suspension means and not upon internal properties of the material, may be adjusted to extremely low frequencies.

From the above considerations, it is apparent that the lightness and the stiffness of the material are important considerations in the structure of a diaphragm.

On the other hand, it should be noted that low density and stiffness are ordinarily conversely correlated properties of materials. Furthermore, it should be remembered that the diaphragms are made of solid material and, hence, there is a certain minimum to the density of the material which may be used in their construction and, consequently, there is a certain minimum of mass which they may have. In view of this minimum mass, it is not possible to obtain a cone which will follow, without any appreciable lag, the motion of the vibrating element when it executes high frequency vibrations and, consequently, a diaphragm should be constructed in such manner that reliance may be placed in its membrane-like vibration for high frequencies.

A further consideration relative to the stiffness of the diaphragm concerns its internal-resonance frequencies. The relation between the stiffness and the density of a diaphragm should be such that these frequencies are rather high. On the other hand, it should be constructed of such material that its internal vibration may be rapidly damped out.

Finally, as it is necessary, for satisfactory operation at high frequencies, that the diaphragm should have the same properties throughout its volume, it is desirable that it should be seamless.

It is clear then that sound-amplifying diaphragms should be constructed with a certain compromise relative to the stiffness, while, on the other hand, they should be of as low density as possible and should present as much area as possible to the elastic medium in which they vibrate. That this state of affairs is not entirely attainable with fabric diaphragms, which ordinarily consist of stiff and heavy material throughout, is obvious.

It is, accordingly, an object of our invention to provide a diaphragm that shall have a smooth frequency-response characteristic.

A further object of our invention is to provide a diaphragm that shall not have resonance frequencies within the audible range of the sound spectrum.

Still another object of our invention is to provide a diaphragm that shall efficiently and accurately amplify the motions of an electro-magnetically excited vibrating element.

Another object of our invention is to provide a diaphragm of such simple structure that it lends itself with facility to large-quantity manufacture.

More specifically stated, it is an object of our invention to provide a seamless conoid diaphragm, having a low weight per unit of radiating area, a large surface area adjacent to the elastic medium in which the sound is produced and a degree of stiffness small enough to make it responsive to high-frequency vibrations and great enough to permit it to vibrate piston-like at low frequencies and to be free from internal resonant frequencies.

According to our invention, we provide a conoid diaphragm constructed of a plurality of layers of different materials. The external layers are thin, have a high ratio of stiffness to density and are, moreover, airtight, while the internal layers are relatively thick, have a low density and are preferably constructed of porous moulded material.

Finally, we provide means for constructing a specific form of conoid diaphragms.

The novel features that we consider characteristic of our invention are set forth with particularity in the appended claims. The invention itself, however, both as to its organization and its method of operation, together with additional objects and advantages thereof, will best be understood from the following description of certain specific embodiments of our invention, when read in connection with the accompanying drawings, in which Figure 1 is a view, in perspective, of a preferred embodiment of our invention;

Fig. 2 is a view, in perspective, of the apex of a diaphragm constructed according to our invention;

Figs. 3, 4, 5 and 7 are views, in perspective, of portions of the apexes of several modifications of our invention;

Fig. 6 is a view, in perspective, of a portion of a diaphragm equipped with a mechanical filter that will be described hereinafter;

Fig. 8 is a sectional view through the material of a diaphragm to show the structure of the layers constituting it;

Fig. 9 is a schematic representation of the electrical analogy of a mechanical filter used in one modification of our invention;

Fig. 10 is a vertical sectional view of a schematic arrangement of the apparatus used in making a corrugated diaphragm according to the precepts of our invention;

Fig. 11 is a vertical sectional view of a schematic arrangement of the apparatus used in making the diaphragm, showing the male and female dies in the process of compressing the diaphragm material;

Fig. 12 is a curve diagram showing the frequency-response curves of diaphragms equipped with modifications of the mechanical filter shown in Fig. 6;

Fig. 13 is a view, in section, of a diaphragm, before it has been modified to receive the voice coil;

Fig. 14 is a view, in front elevation, of another and preferred machine for making the diaphragms;

Fig. 15 is a view, in perspective, of the movable bracket supporting the female die in the machine;

Fig. 16 is a view, in perspective, of the channel in the machine through which the pulp and the heated air passes;

Fig. 17 is a view, in perspective, of the female die in the machine;

Fig. 18 is a view, in perspective, of the supporting pot for the female die;

Fig. 19 is a view, in perspective, of the bracket on which the supporting pot is disposed;

Fig. 20 is a view, in perspective, of the cam that controls the operation of the valves in the machine.

The apparatus shown in the drawings comprises a conoid diaphragm 1 made up chiefly of a thin supporting layer 2 of an amorphous material, preferably paper pulp, ordinarily sized with resin, glue or starch, that has been coalesced by compression, and dried. In view of the fact that it is desirable that the diaphragm shall have a low density, the conoid is moulded in such manner and of such material that it is thin and porous. To give it the necessary stiffness, and, furthermore, to render it air-tight, the conoid is sprayed on both sides with layers of stiffening material, such as lacquer, shellac, "gloss oil", resinates, unplasticized copal, or short synthetic gum varnishes, and then baked. The material of the conoid thus comprises the central homogeneous layer 2, supporting, on each side, a plurality of layers 3 of stiff material.

To further assure that a diaphragm shall have the physical properties to yield the most satisfactory results, it has been a customary practice in the art, to construct the conoid of a form that has been suggested as suitable by experimental and theoretical considerations.

Corrugated cones have given a certain degree of satisfaction, in this respect. However, it has been found that a diaphragm, such as is shown in Fig. 1, comprising apex and rim sections 5 and 6, respectively, of curvature greater than the curvature of a central section 7 tangent to these terminal sections, is not only less expensive than the corrugated conoids but also yields far more satisfactory results.

By reason of the fact that it is desirable that the surface of the diaphragm shall present as great an area as possible to the elastic sound medium, the radiating surface 8 of the conoid is irregular in contour, thus yielding a greater surface area than would a smooth conoidal surface. Furthermore, it has been found experimentally that irregularities in the surface of a diaphragm increase the dispersion of the radiated waves and, hence, tend to smooth out the frequency-response characteristic. To further emphasize the latter advantage, peripheral corrugations may be added to the conoid surface.

A strip 9 of flexible air-tight material is fastened to the outer rim of the conoid. The strip is, in turn, fastened to a baffle plate or to any other suitable support and, while it allows the diaphragm to vibrate freely, it prevents a reaction between the currents of the disturbed elastic medium and the diaphragm that may result from the passage of the currents around its rim.

The diaphragm may be adapted variously to support the vibrating element near its apex. Figs. 1, 2, 3, 5, 6 and 7 show the vibrating element as a coil 10, commonly known as the voice coil, wound on a cylindrical insulator 12 and having a plurality of terminals 11 leading to the output of the source of modulated audio current. Fig. 4 shows a small metallic truncated cone 13 having an opening 14 in its end wherein a rod, connected to the vibrating element, may be rigidly soldered or bolted.

Fig. 5 shows the coil-supporting cylinder 12 as fastened to a collar 15 projecting outwardly from the end of the diaphragm 1 and molded integrally therewith, and Fig. 7 shows the collar 15 projecting inwardly. A disc 16, also molded integrally with the collar 15 at its rim, is provided with a hole 17 in its center to permit the passage of a bar whereon the diaphragm is supported. The voice coil 10 may thus be centered relative to a magnetic element that coacts in producing its vibration.

Fig. 2 shows another form of diaphragm-supporting or coil-centering element comprising a plurality of fibres 18 fastened to the diaphragm 1 and to the fixtures for supporting the conoid.

The flexibility of the device 18 or 16 that connects the diaphragm to the diaphragm-supporting element is one of the important factors dominating the resonant frequency of the sound amplifier when it vibrates as a piston. Hence, as it is desirable that the resonance shall be small, in this case, the discs, as shown in Figs. 3 and 6, are provided with perforations 19 to increase their flexibility. The perforations in the disc 16 near the apex of the diaphragm are ordinarily not molded in the diaphragm but are formed by a stamping operation after the molding operation is completed.

In view of the fact that it is of advantage to modify the frequency-response characteristic of the cone, a mechanical filter, shown in Fig. 6, is provided in one embodiment of our invention.

The conoid is provided with a shoulder 20 molded integrally with its narrow end, and the collar 15 and disc 16 are molded integrally with the shoulder 20. A conoidal truncated element 21 is fastened to the diaphragm adjacent to the shoulder 20 and, in combination with it, which is semi-flexible, it acts as a tuned mechanical filter.

In the electrical analogy of the filter shown in Fig. 9, $Mc$ represents an inductance analogous in mechanical theory to the mass of the vibrating voice coil element.

$C$ represents a capacity analogous to the flexibility of the molded shoulder of the diaphragm.

$M$ represents an inductance analogous to the mass of the conoidal ring fastened to the cone.

$R$ represents a load analogous to the radiation resistance of the diaphragm.

$Fi$ represents an electromotive force analogous to the force acting on the vibrating element.

$Fo$ represents an electromotive force analogous to the force acting on the conoidal ring, and hence, tending to vibrate the diaphragm.

It can easily be shown that $$\overline{Fo} = \frac{\overline{Fi}}{\sqrt{(1-W^2McC)^2 + \frac{w^2}{R^2}(M+Mc-w^2MMcC)^2}}$$

where $\overline{Fo}$ = the magnitude of $Fo$
$\overline{Fi}$ = the magnitude of $Fi$
$w$ = the angular frequency transmitted by the diaphragm.

It is clear, from the above equation, that the mass of the conoidal ring may be varied to modify the frequency-response characteristic of the diaphragm.

As shown in Fig. 12

A is the frequency-response curve that a cone without a filter yields.

B is the curve that a cone yields in which M is negligible and C is large.

C is the curve that a cone yields in which both M and C are large.

D is the curve that a cone yields in which both M and C are small.

One method of producing the molded cones is exemplified by Figs. 10 and 11.

The pulp 22 is deposited on a cloth 23, and may be coalesced by compression between a male die 24 and a female die 25. An opening 26 is provided in the female die 25 to permit the discharge of the liquid exuding from the pultaceous mass.

Another and preferred method of molding the diaphragms is exemplified by Figs. 14 to 20.

The pulp is disposed in a tank 27 supported by a plurality of vertical rods 28. Water is supplied to the pulp at a predetermined rate, through a tube 29, that is equipped with a valve 30 resiliently held in closed position, and adapted to be opened periodically by the coaction of a rotating peripheral cam 31, rigidly supported on a plurality of rods 32, and a bell crank 33. The crank 33 is fastened at one end to the shaft 34 on which the gate of the valve 30 is mounted, while a knob 35, supported at its other end, and moving under the action of the cam 31, rotates it about the center of the valve 30 as an axis, and hence rotates the gate to its open position.

A valve 36, the position of which is similarly controlled by the coaction of a second cam 37 and another crank 38 when in open position, allows a definite quantity of the pulpy mass to pass down a tube 39. The latter is aligned with the opening in the pulp tank at its upper end, while its lower end and the end of the stem 41 of a funnel 42 are held in engagement by a collar 43.

The water control cam 31 and the pulp control cam 37 are so timed that as soon as the valve 30 controlling the water-feed is closed the valve 36 controlling the pulp delivery is opened. Furthermore, as soon as a sufficient quantity of pulp is deposited on a perforated screen 44 that subtends, the open end of the funnel 42, the pulp valve 36 is closed and a third valve 45 controlled, as were the other two, by a crank 46 and cam 47 is opened. The cam 47 regulates the passage of hot compressed gas from a tank 48. The flow of the gas continues until the pulpy mass has been coalesced into a conoid by compression against the screen 44 and has been dried.

The cams controlling the supply of water, pulp and gas are concentric and rotate with their supporting rods 32 that are rigidly supported on a gear 49 and rotate therewith. The gear 49 is in turn driven by a pinion 50 rigidly mounted on a shaft 51 rotating in a bearing 52, cast integral with a bracket 53 that is mounted on one of the rods 28 supporting the pulp tank 27. The shaft 51 is driven from the prime mover (not shown) of the apparatus through a belt 54.

The rim of the perforated screen 44 is equipped with a flange 55, the lower edge of which coincides with the upper edge of a cylinder 56 that extends upward from a shoulder 57 in a pot 58 supporting the screen 44. The pot passes through a ring 59 in a supporting bracket 60, its shoulder 67 resting against the torodial surface.

A bearing 61 is substantially centrally located on the pot-supporting bracket 60, whereby the bracket and the elements that it supports are rotatably mounted on a pin 62, extending from one of the tank-supporting rods 28.

The bracket 60 is yieldingly urged towards its closed position by a spring 63, one terminal of which passes through a bored boss 64 near its end, and the other terminal of which is fastened to a tank-supporting rod 28.

The pot 58 is locked in its closed position, by a plurality of levers 65 equipped with grooves 66, at this lower end. The grooves 66 are engaged by a plurality of machined tongues 67 cast integral with the toroid 59.

The bottom of the pot 58 is convexed downward and a hole 68 is located in its center. This arrangement facilitates the drainage of the water exuded from the pulp when the pot is in closed position Furthermore, when the pot 58 is in open position the hole 68 engages with the mouth 69 of a cock or valve 71. At the same time the convexed portion of the bottom engages a valve-controlling lever 70, opening the valve 71 and permitting compresesd air to flow into the pot 58 and to dislodge the cone that has been formed and dried during the preceding closed position of the pot.

At their upper ends the levers 65, that lock the pot in its closed position, are equipped with bored bosses 72, whereby they are pivotally supported on a plurality of pins 73 fastened in a bar 74 extending between the tank-supporting rods 28. Approximately centrally located in each lever 65 is a cam slot 75.

A horizontal ring 76 pinned to a plurality of vertical bars 77 passes through the slots 75 in the levers. The vertical bars 77 traverse guide bosses 78 and are, in turn equipped, at their upper ends with pins 79 that ride in a cam slot 80 milled in a cylinder 81 fastened to the gear 49, that rotates about the tube 39. The vertical position of the bar 77, and hence of the ring 76, is thus determined by the angular position of the gear 49, and the levers 65 are thus disengaged periodically from the pot-supporting bracket 60.

A surface cam 82 located on the surface of the gear 49 periodically varies the vertical position of the end of a lever 83 pivotally supported on a pin 84 in a plate 85 that is mounted on a tank-supporting rod 28. The other end of the pivoted lever 83 is equipped with a slot 86 which is traversed by a stud fastened to the upper end of a rod 87. The rod 87 passes through a pivoted guide 88, and is loosely pinned to the pot-supporting bracket 60. Hence, as it slides and pivots under the action of the cam actuated lever 83, it moves the pot 57 to open position against the action of the spring 63 or allows it to close under the action of the spring 63.

As is shown in Figs. 14 and 20, the two cams associated with the gear 49 and the three cams associated with the valves are so timed that the desired sequence of the operations necessary in making the cones is obtained.

A diaphragm produced by the machine is shown, in section, in Fig. 13. As is seen from the drawing the conoid is of greater thickness at the apex than it is at the rim. This feature is particularly advantageous, since it tends to localize the stiffest material near the apex where it is most necessary. On the other hand, the conoid is light near the rim where, for satisfactory operation at high frequencies, lightness is desirable and stiffness is inconsequential.

Although we have shown and described certain specific embodiments of our invention, we are fully aware that many modifications thereof are possible. In particular, we are aware that diaphragms constructed according to the precepts of our invention may have other forms than the conoidal forms described herein.

Our invention, therefore, is not to be restricted except insofar as is necessitated by the prior art and by the spirit of the appended claims.

We claim as our invention:

1. A sound diaphragm of molded material, at least one of the surfaces of said diaphragm being irregular and each surface of said diaphragm being covered by a layer of stiff material.

2. A sound diaphragm of porous, molded unimpregnated material, the surfaces of said diaphragm being covered by a plurality of layers of stiff impervious material.

3. A sound reproducer comprising a conoid diaphragm of porous, molded material, flexible supporting means for said diaphragm disposed on its rim, mounting means for said diaphragm disposed near its apex and comprising a plurality of fibres, and vibrating means rigidly fastened to said diaphragm adjacent to said apex.

4. A conoid sound diaphragm of porous molded material, a cross-section of which, taken parallel to the axis of said cone, has certain radii of curvature near the apex and rim and a greater radius of curvature between these two sections, said section of greater radius of curvature being tangent to said sections of smaller radii of curvature.

5. A conical sound diaphragm of molded porous material, having, near its apex, a shoulder parallel to the base of said diaphragm and having a cylindrical collar, molded integral with said shoulder, the elements of which are parallel to the axis of said diaphragm.

6. A conoid sound diaphragm of porous molded material having, near its apex, a shoulder parallel to the base of said diaphragm and having a cylindrical collar molded integral with said shoulder, the elements of which are parallel to the axis of said diaphragm, in combination with a metallic ring of conoidal section mounted on said diaphragm concentric with said collar and adjacent to said shoulder.

7. A conoid sound diaphragm of porous molded material having a cylindrical collar molded integral with it, near its apex, and a perforated disc molded integral with said collar on its rim.

8. A peripherally corrugated conoid sound diaphragm of porous molded material, a cross-section of which, taken parallel to the axis of said cone, has certain average radii of curvature near the apex and rim and a greater average radius of curvature between these two sections, said sections of greater radius of curvature being tangent to said sections of smaller radii of curvature.

In testimony whereof, we have hereunto subscribed our names this 8th day of February, 1930.

RICHARD W. CARLISLE.
ROLAND W. NYE.

DISCLAIMER 1,901,631.—*Richard W. Carlisle*, Oaklyn, N. J., and *Roland W. Nye*, Wilkinsburg, Pa. DIAPHRAGM. Patent dated March 14, 1933. Disclaimer filed June 29, 1937, by the assignee, *Westinghouse Electric & Manufacturing Company.*
Hereby enters this disclaimer to claim 7 of said specification.
[*Official Gazette August 10, 1937.*]